United States Patent [19]

Shiomi et al.

[11] Patent Number: 5,531,642

[45] Date of Patent: Jul. 2, 1996

[54] VIBRATION-PROOF POWER TAKE-OFF DEVICE FOR ENGINE INCLUDING TWO DISPLACEMENT ABSORBING JOINT MEMBERS CONNECTED BY A RESILIENT MEMBER

[75] Inventors: Kazuyuki Shiomi; Hiroshi Mizuguchi; Shoji Imakado, all of Saitama-ken, Japan

[73] Assignee: Honda Giken Kogyo Kabushiki Kaisha, Tokyo, Japan

[21] Appl. No.: 177,681

[22] Filed: Jan. 5, 1994

[30] Foreign Application Priority Data

Nov. 16, 1993 [JP] Japan .................. 5-286525
Nov. 16, 1993 [JP] Japan .................. 5-286526

[51] Int. Cl.⁶ .................................................. F16D 3/50
[52] U.S. Cl. .................................... 464/74; 464/85
[58] Field of Search ........................... 464/73, 74, 76, 464/83, 85, 92, 93, 147, 152, 89, 112, 119, 162

[56] References Cited

U.S. PATENT DOCUMENTS

| | | |
|---|---|---|
| 2,123,307 | 7/1938 | Kattwindel . |
| 2,337,287 | 12/1943 | Williams . |
| 2,908,153 | 10/1959 | Kolls et al. ............... 464/93 |
| 3,313,125 | 4/1967 | Hein ............... 464/73 X |
| 3,362,191 | 1/1968 | Louette ............... 464/93 X |
| 3,438,221 | 4/1969 | Paulsen . |
| 3,528,263 | 9/1970 | Stern ............... 464/119 X |
| 3,884,049 | 5/1975 | Pauli ............... 464/73 |
| 3,888,450 | 6/1975 | Seilenbinder ............... 248/358 R |
| 3,995,513 | 12/1976 | Amdall et al. ............... 464/92 X |
| 4,183,496 | 1/1980 | Brock et al. . |
| 4,193,748 | 3/1980 | Swain ............... 464/112 X |
| 4,424,046 | 1/1984 | Ziegler ............... 464/74 |
| 4,483,685 | 11/1984 | Spasiano et al. ............... 464/74 X |
| 4,627,885 | 12/1986 | Arlt ............... 464/74 X |
| 5,267,630 | 12/1993 | Watanabe et al. . |

FOREIGN PATENT DOCUMENTS

| | | |
|---|---|---|
| 0012669 | 6/1980 | European Pat. Off. ............... 464/83 |
| 2224670 | 10/1974 | France . |
| 489044 | 7/1938 | United Kingdom . |
| 705074 | 3/1954 | United Kingdom . |
| 1193482 | 6/1970 | United Kingdom . |

*Primary Examiner*—Daniel P. Stodola
*Assistant Examiner*—Eileen A. Dunn
*Attorney, Agent, or Firm*—Armstrong, Westerman, Hattori, Mcleland & Naughton

[57] ABSTRACT

A vibration-proof power take-off device for an engine includes a resilient support device for carrying the engine on a support, and a displacement absorbing joint for connecting an output shaft of the engine to a power take-off member. The displacement absorbing joint has a first joint member connected to the output shaft, a second joint member connected to the power take-off member, and a resilient member for resiliently interconnecting the joint members. The first joint member includes a first hub having radially projecting first transmitting fins and the second joint member includes a second hub concentrically surrounding the first hub and having radially projecting second transmitting fins. The intermediate member has intermediate fins opposed to the first and second fins in a rotational direction. Opposed surfaces of the intermediate fins and the first and second fins are interconnected through the resilient member. The joint members and the intermediate fins are disposed concentrically, and the entire joint can be made compact.

20 Claims, 12 Drawing Sheets

VIBRATION-PROOF POWER TAKE-OFF DEVICE FOR ENGINE INCLUDING TWO DISPLACEMENT ABSORBING JOINT MEMBERS CONNECTED BY A RESILIENT MEMBER

BACKGROUND OF THE INVENTION

1. Field of the Invention

The present invention relates to a vibration-proof power take-off device for an engine, for driving various working machines, and particularly, to a vibration-proof power take-off device including a resilient support member through which an engine is mounted on a support, and a power take-off member connected to an output shaft of the engine through a displacement absorbing joint. The invention also relates to a displacement absorbing joint for use with such vibration-proof power take-off device and the like.

2. Description of the Related Art

It is well known that when an output shaft of an engine and a follower member to be driven such as a wheel are spaced from each other, as is a case in an automobile, the engine is carried on a support with resilient support members interposed therebetween, and the output shaft of the engine is connected through a Cardan shaft to the follower member for preventing vibration of the engine from being transmitted to the support or to the follower member.

However, in an actual case, there is no appropriate means for preventing the vibration of the engine from being transmitted to the power take-off member, if the output shaft of the engine and the power take-off member are disposed in close proximity to each other.

In the displacement absorbing joint interposed between the output shaft of the engine or the like and the power take-off member, it was impossible to prevent the joint itself from being complicated in structure and increased in size, in order to effectively absorb a fluctuation in torque, an eccentric or transverse misalignment and an angular misalignment generated during transmission of a rotational torque and to prevent a noise.

SUMMARY OF THE INVENTION

Accordingly, it is an object of the present invention to provide a vibration-proof power take-off device for an engine, wherein even if a power take-off shaft is disposed in close proximity to an output shaft of the engine, vibration of the engine is prevented from being transmitted to a power take-off member.

It is another object of the invention to provide a displacement absorbing joint having a compact structure, which can be easily accommodated in a relatively narrow space and enables an effective transmission of rotational torque.

To achieve the above first object, according to the present invention, there is provided a vibration-proof power take-off device for an engine, comprising resilient support means through which the engine is carried on a support, and a displacement absorbing joint for connecting an output shaft of the engine to a power take-off member, the displacement absorbing joint being comprised of a first joint member for connection to the output shaft of the engine, a second joint member for connection to the power take-off member, and a resilient member for resiliently interconnecting both the first and second joint members, the second joint member being rotatably carried on the support through a bearing means.

With the above construction, even if the power take-off member is disposed in close proximity to the output shaft of the engine, the transmission of engine vibration to the power take-off member can be prevented by the resilient support means and the resilient member and by the fact that the second joint member is reliably supported on the bearing means.

In addition to the above construction, the resilient support means for supporting, on the support, the engine with the output shaft disposed horizontally is comprised of a pair of resilient support members and the engine is supported at three points by these resilient support members and the displacement absorbing joint. With this construction, only two resilient support members are exclusively used for supporting the engine. This also contributes to a reduction in production cost.

Further, if a restricting means for restricting the displacement of the engine in an axial direction of the output shaft is further provided between the support and the engine, the engine vibration in the axial direction of the output shaft can be suppressed to a moderate degree to prevent an excessive axial load from being applied to the displacement absorbing joint, thereby insuring its durability.

Yet further, the output shaft of the engine may be disposed vertically, and the resilient support means for supporting the engine in the horizontal support may be comprised of a plurality of resilient members. The displacement absorbing joint may be disposed in a space defined between the support and engine by the resilient support members. With such construction, a space exclusively used for placement of the displacement absorbing joint is not required. Thus, despite the displacement absorbing joint being used, it is possible to prevent the contact of another part to the displacement absorbing joint to prevent damage thereof, while avoiding an increase in size of the power take-off section.

Additionally, if four resilient support members for supporting the vertical engine on the support are provided, it is possible to achieve a stable supporting of the engine and a further effective vibration-damping function.

In addition, to achieve the above second object, according to the invention, there is provided a displacement absorbing joint comprising a first joint member having a first hub, a second joint member having a second hub concentrically surrounding the first hub, and an intermediate member interposed between the first and second joint members, the first hub provided with a plurality of first transmitting fins projecting radially outwardly from the first hub through notches provided in the second hub, the second hub provided with a plurality of second transmitting fins projecting radially outwardly from the second hub at distances circumferentially spaced from the first transmitting fins, the intermediate member provided with a plurality of intermediate fins opposed to the first and second transmitting fins in a rotational direction, and opposed surfaces of the intermediate fins and the first and second transmitting fins being interconnected through resilient members.

With the above construction, the first and second joint members and the intermediate fins of the intermediate member are disposed concentrically. Therefore, it is possible to make the entire joint compact.

In addition to the above construction, if a gap, which can be eliminated when the angle of relative rotation of the first and second hubs reaches a given value, is provided between opposed portions of the first transmitting fins and the notches in a rotational direction thereof, an excessive increase in angle of the first and second joint members can be suppressed by the abutment of the opposed portions of the first transmitting fins and the notches of the second hub, thereby providing an improved durability to the resilient members.

Further, if a pair of the first transmitting fins are disposed on one diametrical line, and a pair of the second transmitting fins are disposed in a direction substantially perpendicular to the diametric line on which the first transmitting fins are disposed, the transmission of a rotational torque between both the joint members can be achieved while effectively absorbing an eccentric or transverse misalignment and an angular misalignment, with a simplified construction provided by the use of a reduced number of the transmitting fins and resilient members.

Yet further, if a rim is mounted on the intermediate member to surround the first and second transmitting fins from a diametrically outer periphery, and the intermediate fins are mounted to project from an inner peripheral surface of the rim and interposed between the first and second transmitting fins, all the first and second joint members and the intermediate members can be disposed concentrically and thus, the joint can be made smaller.

If an annular disk is mounted on the intermediate member and disposed adjacent one side of the first and second transmitting fins, and the intermediate fins are mounted to project from one end face of the annular disk and interposed between the first and second transmitting fins, the joint can be disposed effectively, even when the space for accommodation of the joint is diametrically insufficient.

Further, if a resilient stop member is mounted to at least one of opposed portions of the first transmitting fin and the notch in a rotational direction thereof, the restriction of the angle of relative rotation of the joint members can be performed in a buffering manner by the compressional deformation of the resilient stop member, thereby providing an improved durability to the first transmitting fins and the second hub.

If a resilient stop member is mounted to at least one of radially opposed portions of each of the first and second transmitting fins and the rim, the resilient stop member on the radially opposed portion can be deformed in a compressed manner to restrict the excessive eccentric or transverse misalignment between the joint members in a buffering manner and to insure the durability of the intermediate member.

If the resilient stop member mounted to at least one of rotation-wise opposed portions of the first transmitting fin and the notch is formed integrally with the resilient member, the number of parts can be reduced, and the operation of joining the resilient members to the joint members and the intermediate member can be simplified.

If the resilient stop member mounted to at least one of radially opposed portions of each of the first and second transmitting fins and the rim is formed integrally with the resilient member, the number of parts can be reduced, and the operation of joining the resilient members to the joint members and the intermediate member can be simplified.

Further, if the intermediate member is formed of a material having a density lower than those of the first and second joint members, the rotational vibration of the intermediate member due to an unbalance in weight can be suppressed to the utmost.

If one of the first and second joint members is connected to an output shaft of a driving means, and the other joint member is connected to a power take-off means, the transmission of a rotational torque from the driving means to the power take-off means can be performed extremely efficiently.

In addition, if the power take-off means is a driving pulley, and a pulley-mounting bore is provided in the second hub of the second joint member, it is possible to mount the driving pulley directly to the second hub and thus, various working machines can be driven by a belt.

If a cylindrical shaft is coupled to the second hub of the second joint member and the power take-off means is connected to the cylindrical shaft, the connection structure can be simplified.

The above and other objects, features and advantages of the invention will become apparent from the following description of preferred several embodiments, taken in conjunction with the accompanying drawings.

BRIEF DESCRIPTION OF THE DRAWINGS

FIGS. 1 to 8 illustrate a first embodiment of the present invention, wherein

FIG. 1 is a side view of a power cultivator to which the first embodiment is applied;

FIG. 2 is an enlarged view of an essential portion shown in FIG. 1;

FIG. 3 is a sectional view taken along line 3—3 in FIG. 2;

FIG. 4 is an enlarged view of an essential portion shown in FIG. 3;

FIG. 5 is a sectional view taken along line 5—5 in FIG. 4;

FIG. 6 is a perspective view of a displacement absorbing joint;

FIG. 7 is an enlarged sectional view taken along line 7—7 in FIG. 2; and

FIG. 8 is a sectional view taken along line 8—8 in FIG. 7;

FIGS. 9 and 10 illustrate a second embodiment of the present invention, wherein

FIG. 9 is a longitudinal sectional side view of an essential portion of a power lawn mower to which the second embodiment is applied; and FIG. 10 is a sectional view taken along line 10—10 in FIG. 9;

DESCRIPTION OF THE PREFERRED EMBODIMENTS

The present invention will now be described by way of several embodiments in connection with the accompanying drawings.

Figure 1:
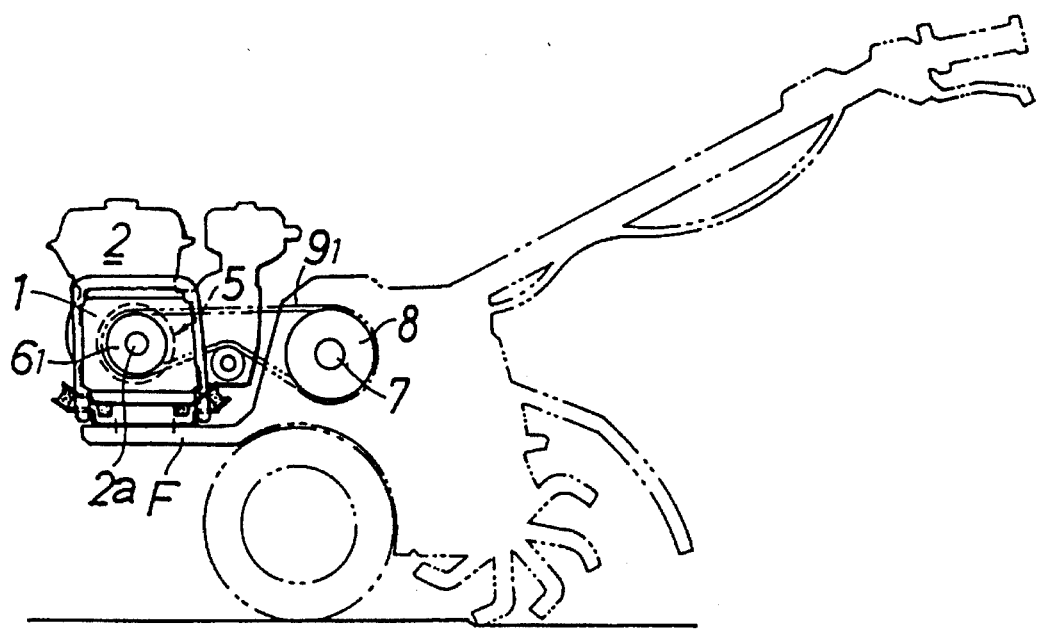
Figure 2:
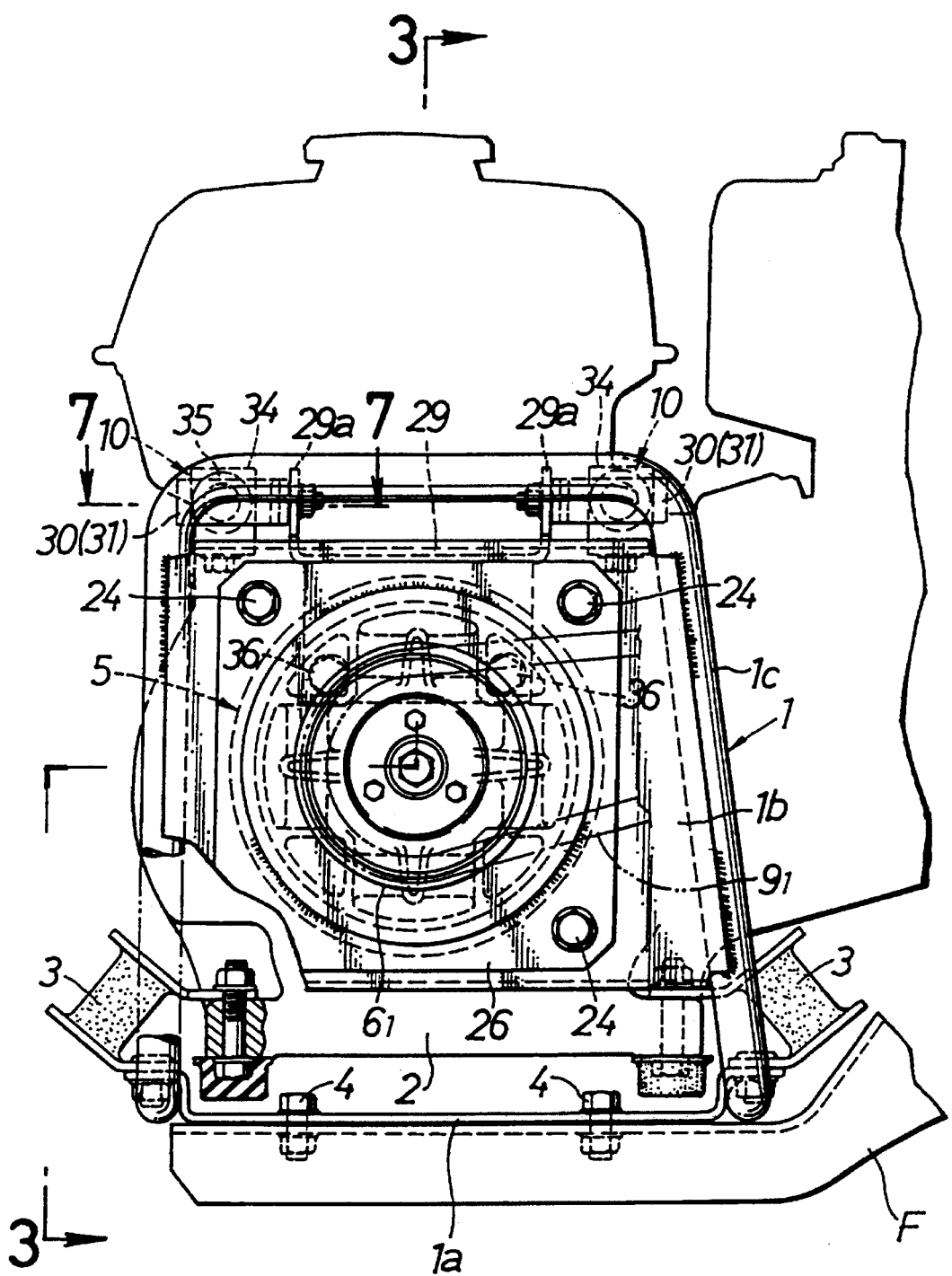
Figure 3:
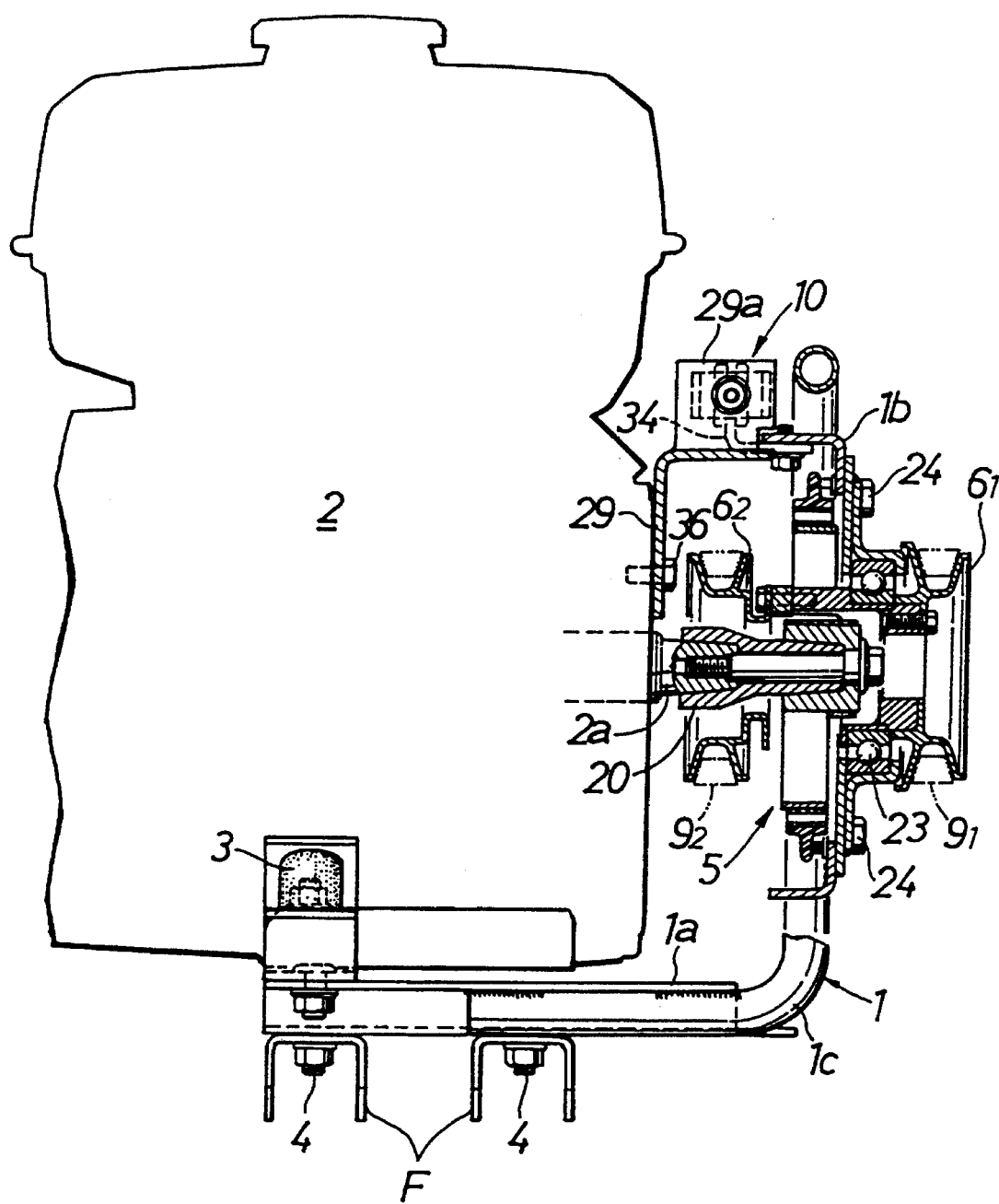

Referring first to FIGS. 1 to 8, a first embodiment is illustrated. As shown in FIGS. 1 to 3, an engine bed 1 serving as a support is secured to a frame F of a power cultivator by means of bolts 4. The engine bed 1 is composed of a horizontal bottom plate 1a, a side plate 1b rising vertically, and a pipe frame 1c connecting the bottom plate 1a and the side plate 1b, and is formed into an L-shape. A pair of resilient support members 3, 3 as resilient support means are mounted to the bottom plate 1a and arranged in a longitudinal direction of the power cultivator. A bottom of an engine 2 is supported on the bottom plate 1a with the resilient support members 3, 3 interposed therebetween. The engine 2 is disposed in such a manner that a crankshaft 2a serving as an output shaft of the engine is directed to a lateral direction of the cultivator. That is, the engine 2 is of a horizontal type.

A displacement absorbing joint 5 according to the present embodiment is mounted to the side plate 1b, and the crankshaft 2a as the output shaft of the engine 2 is connected with first and second driving pulleys $6_1$ and $6_2$ serving as power take-off members through the joint 5. The first driving pulley $6_1$ is connected through a belt $9_1$ to a follower pulley 8 which is secured to a transmission input shaft 7 of the power cultivator. The second driving pulley $6_2$ is connected through a belt $9_2$ to a working machine or an auxiliary machinery (not shown).

Figure 4:
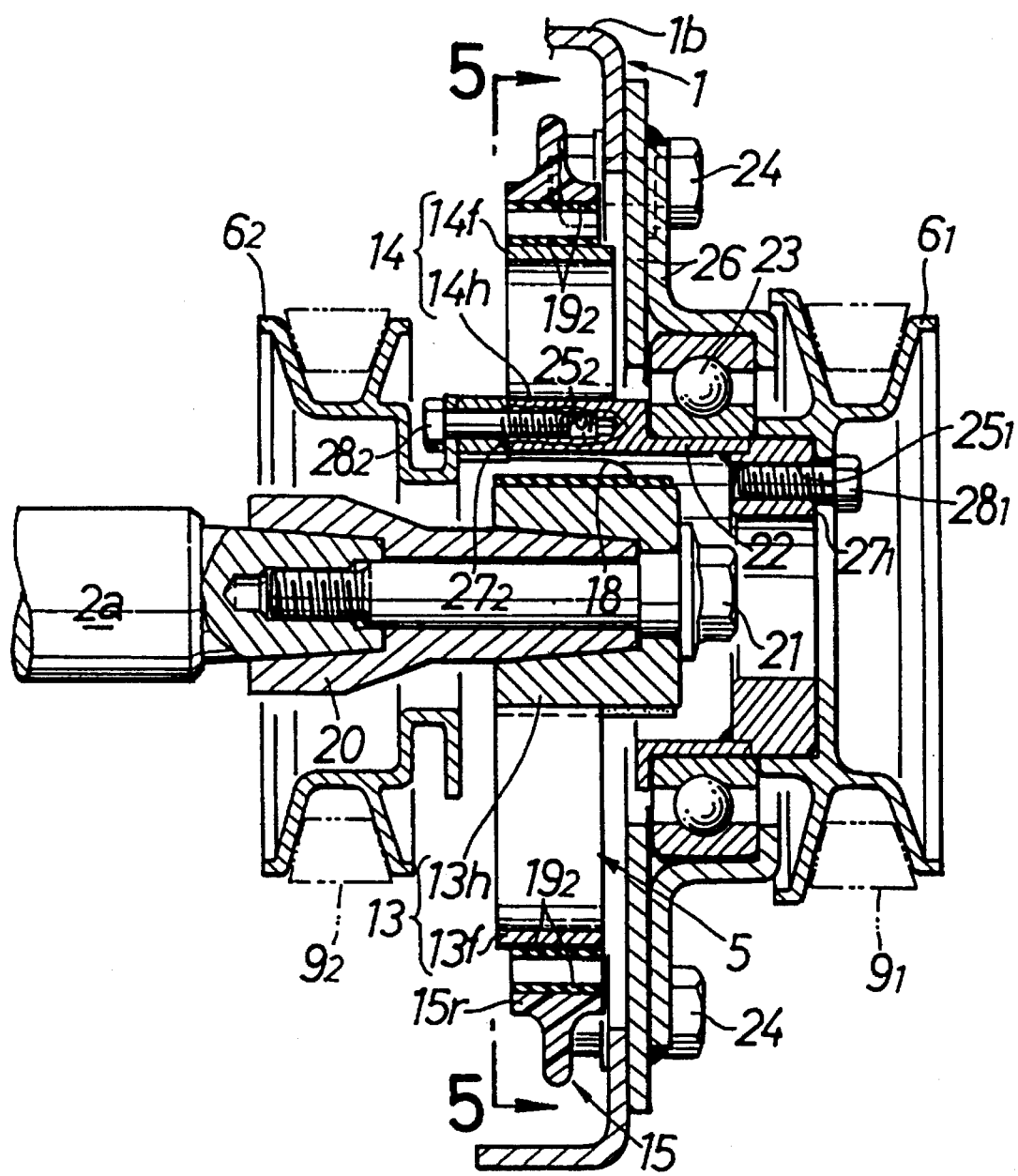
Figure 5:
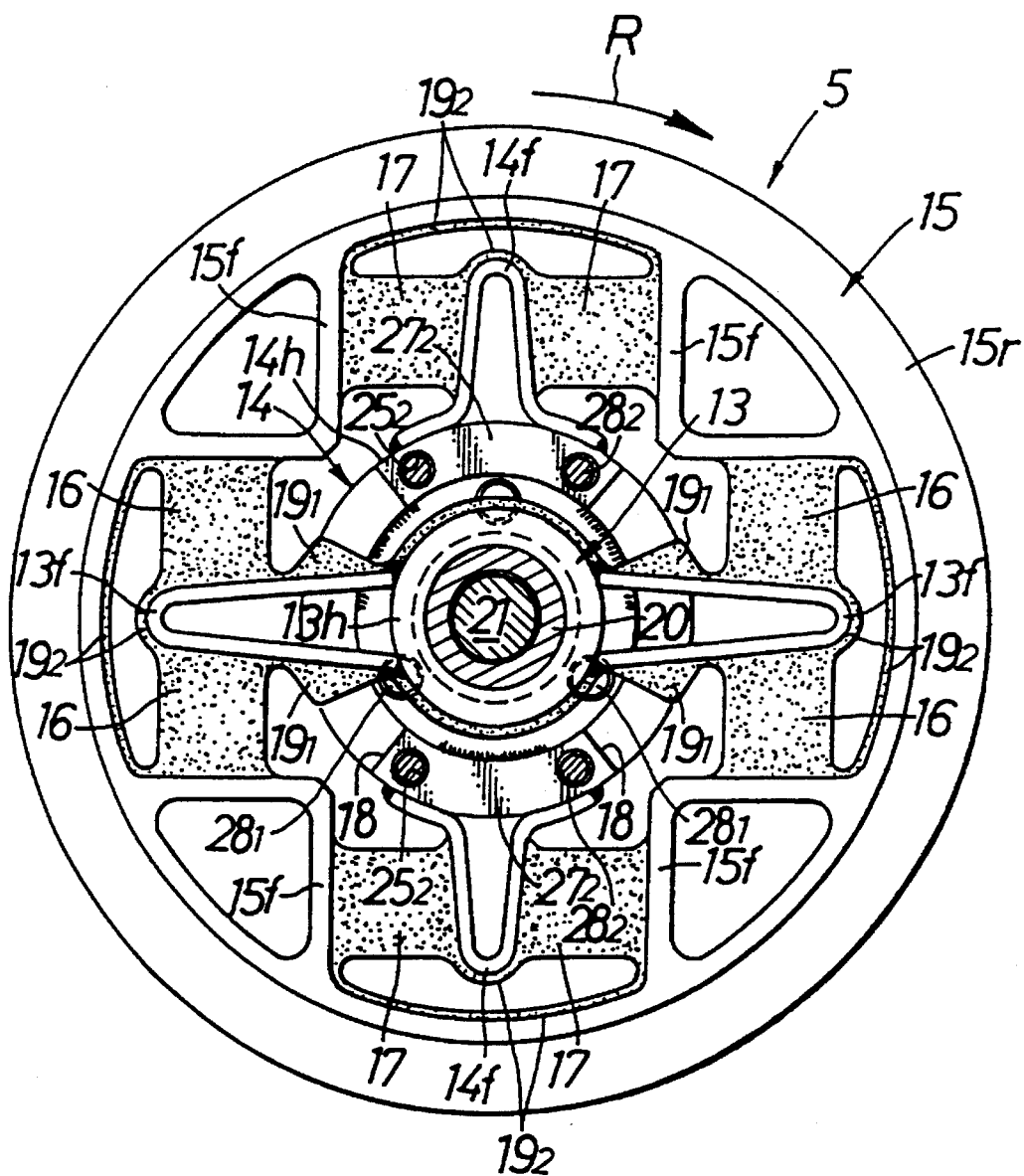
Figure 6:
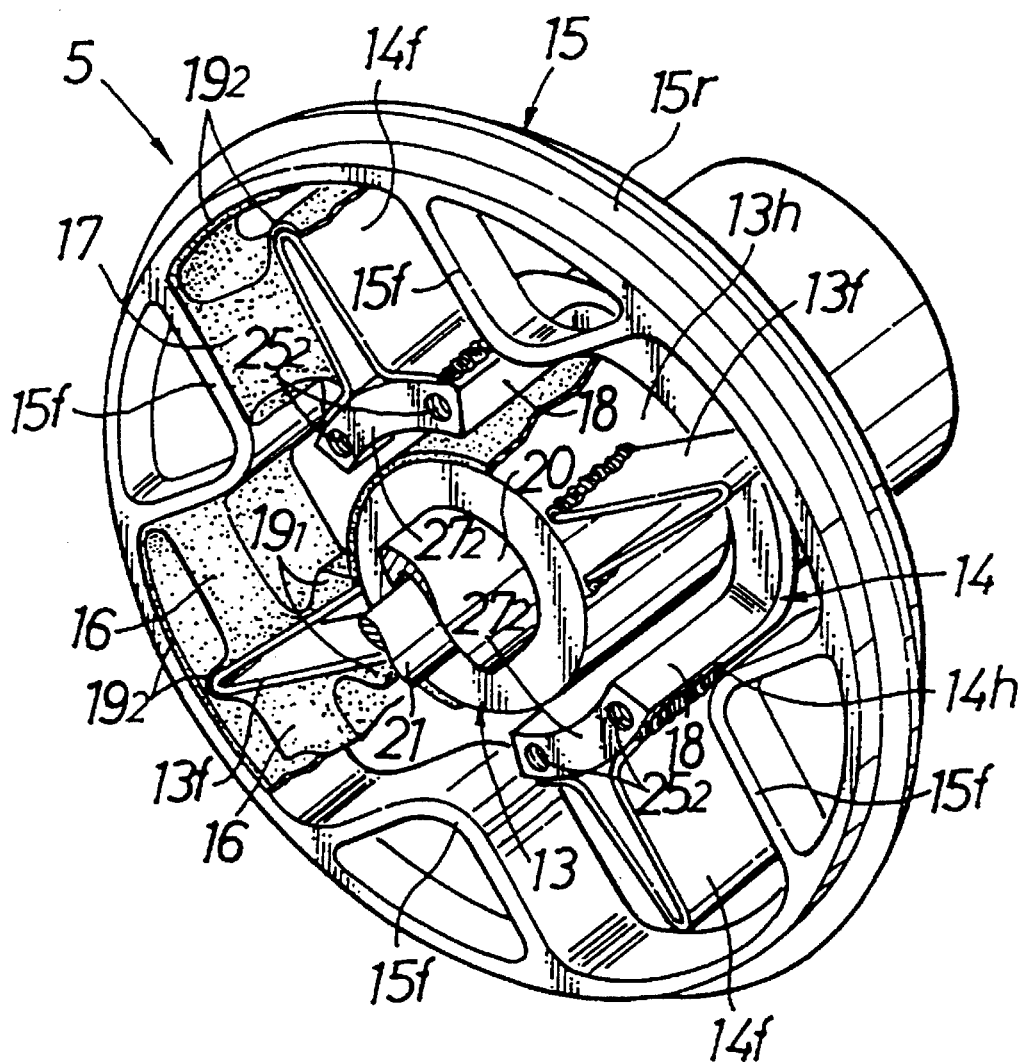

Referring to FIGS. 4 to 6, the displacement absorbing joint 5 is comprised essentially of a first joint element 13, a second joint member 14, an intermediate member 15, and pluralities of first and second resilient members 16 and 17 for resiliently connecting the first, second and third joint members 13, 14 and 15. These resilient members are formed of rubber.

The first joint member 13 comprises a first hub 13h and a pair of first transmitting fins 13f projected from an outer periphery of the first hub 13h so as to extend on one diametrical line of the first hub 13h.

The second joint member 14 has a second hub 14h which is disposed to coaxially surround the first hub 13h from the outside and having notches 18 through which the first transmitting fins 13f are passed. A pair of second transmitting fins 14f are mounted around an outer periphery of the second hub 14h to project therefrom in a direction perpendicular to the first transmitting fins 13f.

The intermediate member 15 is comprised of a rim 15r surrounding the first and second transmitting fins 13f and 14f from the diametrically outside, and four intermediate fins 15f projectingly mounted on an inner peripheral surface of the rim 15r and interposed between the first and second transmitting fins 13f and 14f. Opposed surfaces of the first transmitting fin 13f and the adjoining intermediate fin 15f are interconnected through the first resilient member 16, and opposed surfaces of the first transmitting fin 13f and the adjoining intermediate fin 15f are interconnected through the second resilient member 17. A baking, an adhesive bonding or the like may be used for joining each of the resilient member to corresponding one of the fins. The rim 15r is disposed concentrically with and at a distance diametrically spaced from the first and second hubs 13h and 14h, as shown in FIG. 4.

A first resilient stop member $19_1$ made of rubber may be mounted to one or both of opposed surfaces, in a rotational direction, of the notch 18 of the second hub 14h and the first transmitting fin 13f. In the present embodiment, the first resilient stop member $19_1$ is mounted to only the surface of the first transmitting fin 13f opposed to the notch 18.

A second resilient stop member $19_2$ made of rubber may be mounted to one or both of radially opposed surfaces of each of the first and second transmitting fins 13f and 14f and the rim 15r. In the present embodiment, the second resilient stop member $19_2$ is mounted to both of such radially opposed surfaces.

The intermediate member 15 is formed of a material having a density lower than those of the first and second joint members 13 and 14. For example, if the first and second joint members 13 and 14 are made of iron, the intermediate member 15 is made of light alloy or synthetic resin material.

An extension shaft 20 of the crankshaft 2a is secured to the first hub 13h by means of a bolt 21.

The second hub 14h includes a cylindrical shaft 22 projecting outwardly of the intermediate member 15 on the opposite side from the crankshaft 2a. An inner race of a ball bearing 23 serving as a bearing means is fitted in the cylindrical shaft 22. An outer race of the ball bearing 23 is retained by a bearing holder 26 which is secured to an outer surface of the side plate 1b of the engine bed 1 serving as the support by means of bolts 24. In this manner, the first and second transmitting fins 13f and 14f, the intermediate member 15 and the first and second resilient members 16 and 17 are disposed inside the side plate 1b of the engine bed 1.

Axial outer and inner ends of the second hub 14h serve as first and second mounting portions $27_1$ and $27_2$ having threaded bores $25_1$ and $25_2$ as pulley-mounting bores, respectively. The first and second driving pulleys $6_1$ and $6_2$ are secured to the first and second mounting portions 271 and $27_2$ by means of bolts $28_1$ and $28_2$ screwed into the threaded bores $25_2$ and 252, respectively.

Figure 7:
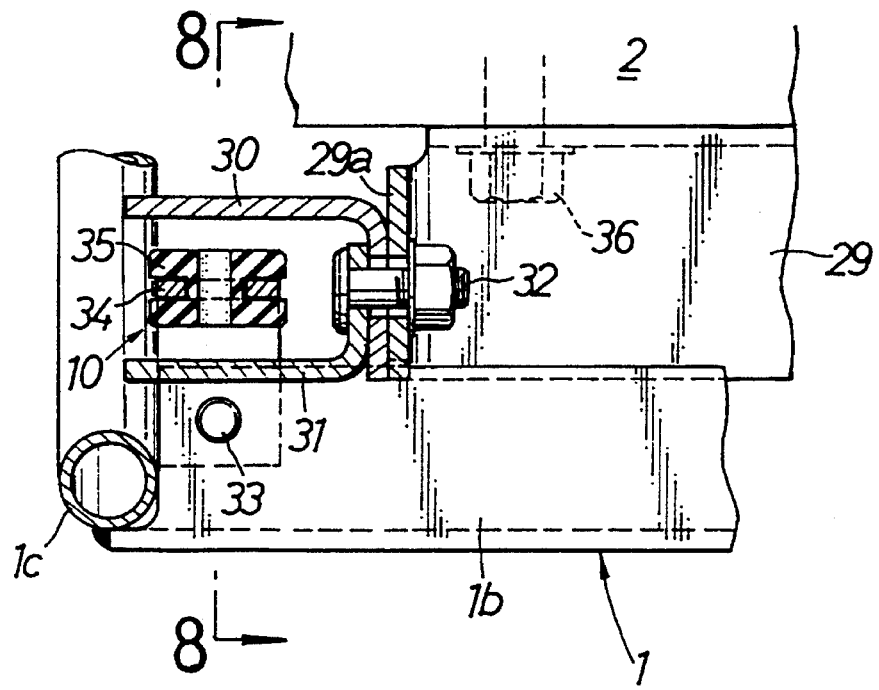
Figure 8:
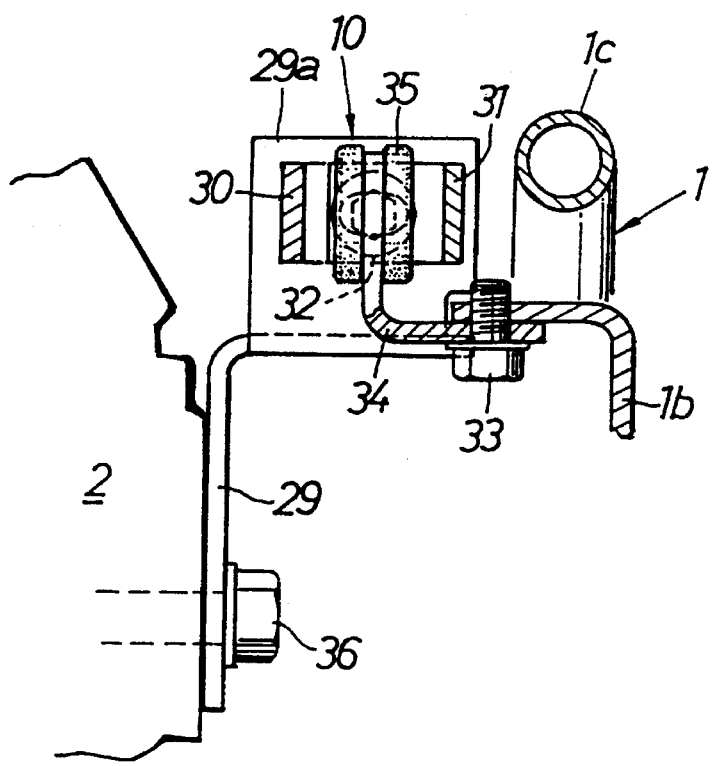

Referring to FIGS. 2, 7 and 8, a bracket 29 is secured to an end face of the engine 2 adjacent the joint 5 by means of bolts 36. The bracket 29 is integrally provided with a pair of ear pieces 29a, 29a extending upwardly within the side plate 1b of the engine bed 1 and arranged along the side plate 1b. A pair of stop pieces 30 and 31 are secured to each of the ear pieces 29a by means of a bolt 32 to confront each other at a spaced apart distance axially of the crankshaft 2a. A support piece 34 is inserted and disposed in a central portion between the stop pieces 30 and 31 and secured to the side plate 1b of the engine bed 1 by means of a bolt 33. A grommet-like resilient member 35 is mounted to the support piece 34 with opposite end faces of the resilient member 35 opposed to the stop pieces 30 and 31 at a given distance. The resilient member 35 and the support piece 34 constituting a restricting means 10 for restricting the axial displacement of the engine 2 to a given level.

The operation of the embodiment will be described below.

When the engine 2 is driven, a rotational torque of the crankshaft 2a of the engine 2 is transmitted sequentially through the first joint member 13, the first resilient member 16, the intermediate member 15 and the second joint member 14 to the first and second driving pulleys $6_1$ and $6_2$ and further through the belts $9_1$ and $9_2$ to predetermined loads to drive them.

During this time, one of the plurality of first resilient members 16 which adjoins the first transmitting fin 13f forwardly in a rotational direction R (see FIG. 5) is compressed by the rotational torque, and one of the first resilient members 16 which adjoins the first transmitting fin 13f rearwardly in the rotational direction R is expanded by the rotational torque. Also, one of the plurality of second resilient members 17 which adjoins the second transmitting fin 14f rearwardly in the rotational direction R is compressed by the rotational torque, and one of the second resilient members 17 which adjoins the second transmitting fin 14f forwardly in the rotational direction R is expanded by such rotational torque.

In this manner, since the first and second resilient members 16 and 17 transmit the torque, while being subjected to compressional and expansional deformations, respectively, a fluctuation in torque can be absorbed. Moreover, particularly, the first and second resilient members 16 and 17 compressed by the rotational torque exhibit a high spring constant characteristic, thereby enabling the transmission of a large amount of torque. In this case, if the compressional deformation of the first and second resilient members 16 and 17 increases and reaches a predetermined value due to an increase in angle of relative rotation of the joint members 13 and 14, then the first resilient stop member $19_1$ is compressed between the first transmitting fin 13f and the second hub 14h. This makes it possible to suppress an excessive increase in such angle of relative rotation, while avoiding an abrupt abutment between the first transmitting fin 13f and the second hub 14h.

The vibration of the engine 2 is absorbed by the pair of resilient support members 3, 3 and the displacement absorbing joint 5. Particularly, if an eccentric load or a declination load or an angular misalignment load is applied to the crankshaft 2a due to the vibration of the engine 2, a load in a shearing or torsional direction is applied alternately to the first and second resilient members 16 and 17. However, since each of the resilient members 16 and 17 exhibits a relatively low spring constant characteristic to the shearing and torsional deformations, eccentric and angular misalignment motions of the first joint member 13 which is integrally connected to the crankshaft 2 are smoothly absorbed. In this case, if the shearing deformation of the first and second resilient members 16 and 17 increases and reaches a predetermined value, the second resilient stop member $19_2$ is compressed between the first and second transmitting fins 13f and 14f and the rim 15r. This makes it possible to suppress an excessive eccentric or transverse misalignment and an excessive angular misalignment of the first joint member 13, while avoiding an abrupt abutment between the first and second transmitting fins 13f and 14f and the rim 15r.

On the other hand, the second joint member 14 integrally connecting the driving pulleys $6_1$ and $6_2$ is carried on the engine bed 1 with the bearing 23 interposed therebetween. Therefore, despite eccentric and angular misalignment motions of the first joint member 13, the second joint member 14 is not vibrated and can keep a given position, thereby preventing the transmission of a vibration to the belts $9_1$ and $9_2$.

Because the displacement absorbing joint 5 exhibits a resilient supporting function with respect to the engine 2 in this manner, only one pair of the resilient support members 3 for supporting the bottom of the engine 2 suffice. Eventually, the engine 2 is supported at three points.

When a head of the engine 2 is greatly swung axially of the crankshaft 2a, the pair of stop pieces 30 and 31 swung along with the engine 2 alternately abut against the resilient member 35 supported on the support piece 34 mounted adjacent the engine bed 1 so as to provide a compressional deformation to the resilient member 35. This makes it possible to suppress, in a buffering manner, an excessive increase in the amount of swinging movement of the engine 2.

In the displacement absorbing joint 5, the intermediate member 5 having a largest diameter is formed of a material having a density lower than those of the first and second joint members 13 and 14. Therefore, even if there is somewhat of an unbalance of weight, the generation of a large vibration can be prevented during rotation at a high speed.

Figure 9:
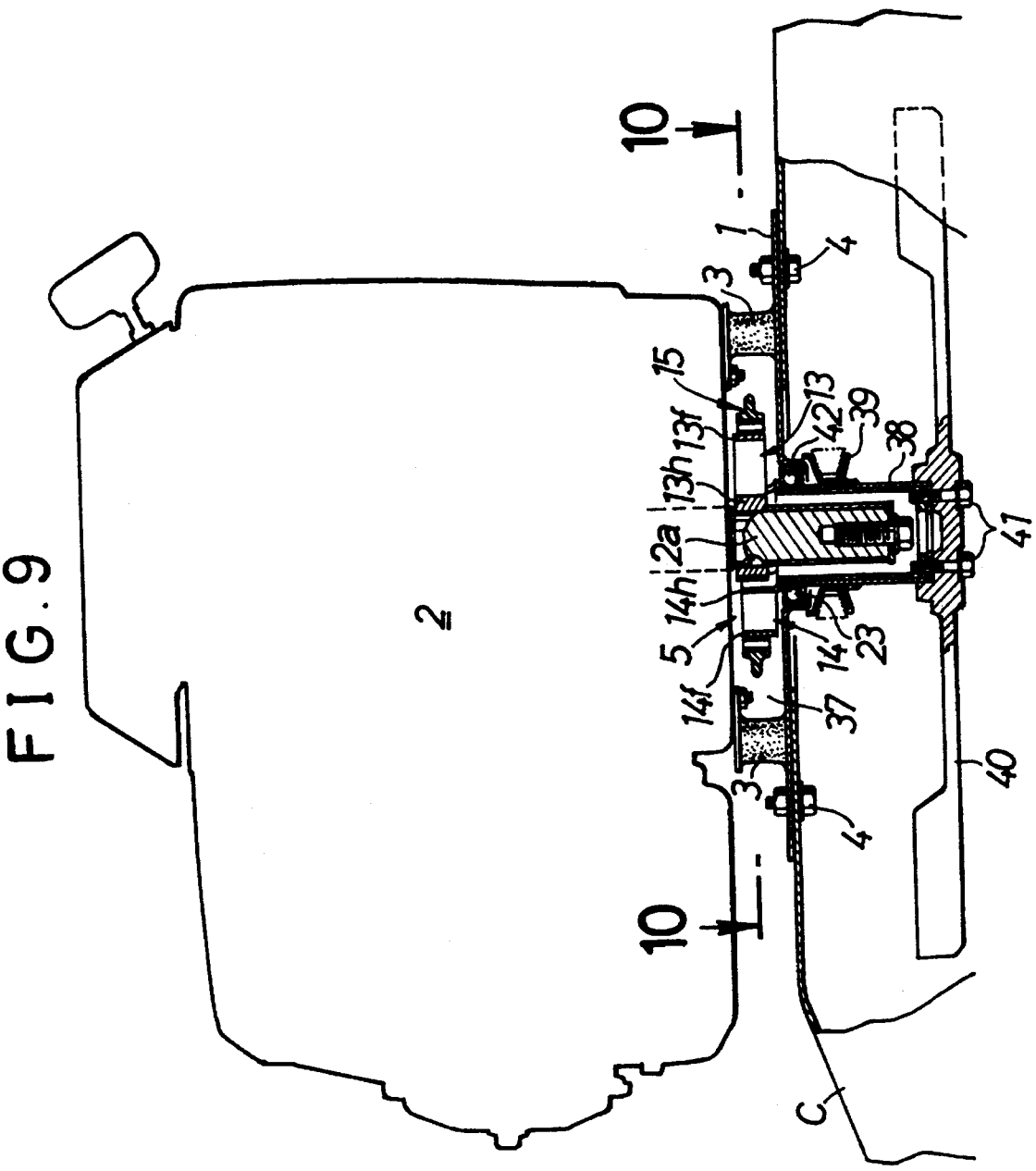
Figure 10:
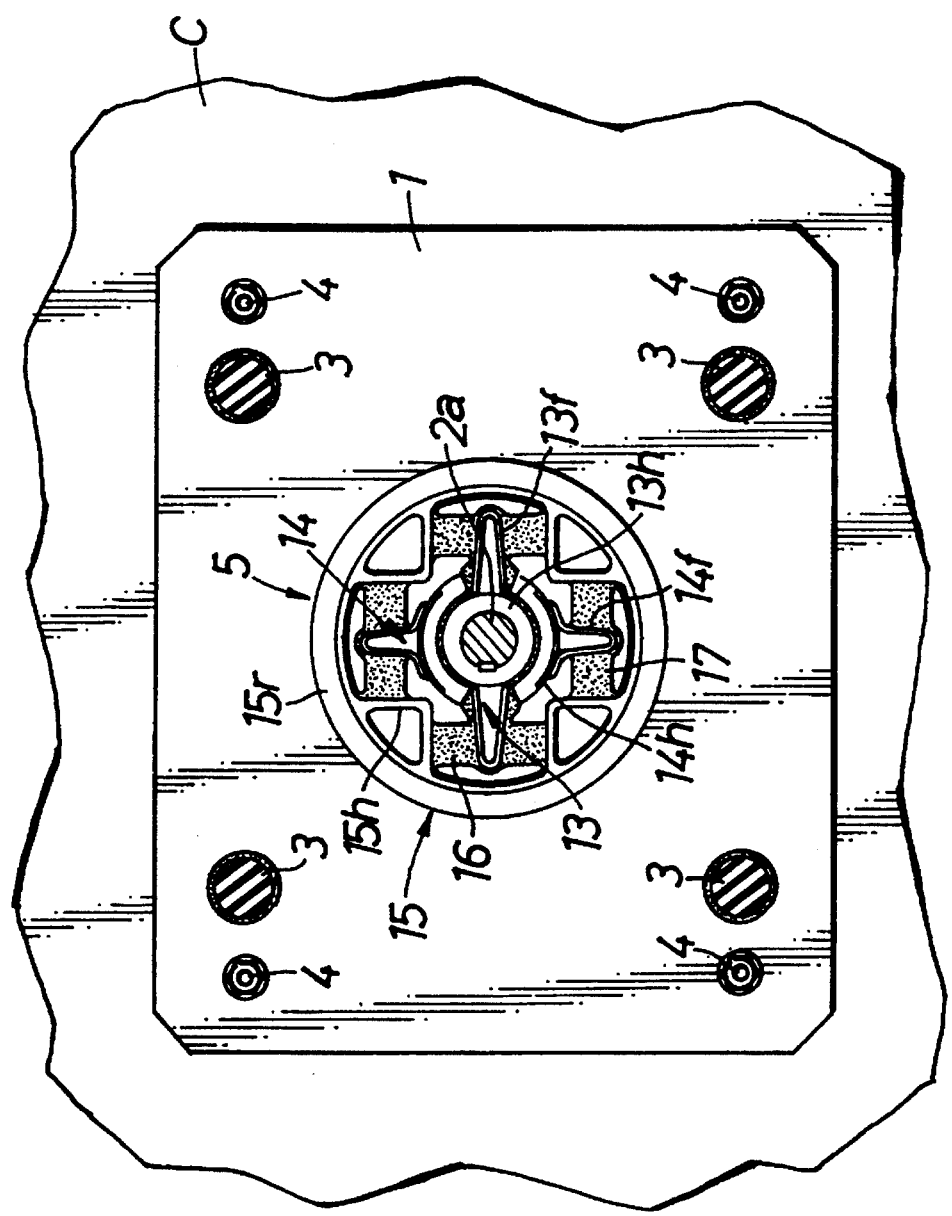

A second embodiment of the present invention applied to a power lawn mower will now be described in connection with FIGS. 9 and 10.

An engine bed 1 serving as a horizontal rectangular support is secured, by means of bolts 4, to an upper surface of a blade casing C of a power lawn mower. An engine 2 is carried on the engine bed 1 through resilient support members 3 disposed as resilient support means at four corners of the engine bed 1. The engine 2 is of a vertical type having a crankshaft 2a vertically disposed as an output shaft.

A space 37 necessarily defined between the engine 2 and the blade casing C due to the resilient support members 3, and a displacement absorbing joint 5 is disposed in the space 37. The displacement absorbing joint 5 comprises a first joint member 13 having a first hub 13h which is keyed directly to a lower end of the crankshaft 2a of the engine 2, and a second joint member 14 having a second hub 14h. A power take-off sleeve 38 (a power take-off member) is fitted to an outer periphery of the second hub 14h. A driving pulley 39 is welded to an outer periphery of the power take-out sleeve 38 for driving a wheel of the lawn mower or an auxiliary machinery through a belt. A blade 40 is secured to a lower end of the power take-off sleeve 38 by means of bolts 41. Bolts 41 are also used for securing the power take-off sleeve 38 to the second hub 14h.

A ball bearing 23 carrying the second hub 14h is mounted in a bearing housing 42 integrally formed on the engine bed 1.

The other remaining construction of the displacement absorbing joint 5 is similar to that in the previously-described embodiment. In FIGS. 9 and 10, parts corresponding to those in the previously-described embodiment are designated by the same reference characters as in the previously-described embodiment.

The displacement absorbing joint 5 is disposed in the space 37 surrounded by the engine bed 1, the engine 2 and the four resilient support members 3. Therefore, a space exclusively used for placement of the joint need not be provided, which makes it possible to avoid an increase in size of the power take-off section and to prevent the contact of another part to the displacement absorbing joint 5.

Figure 11:
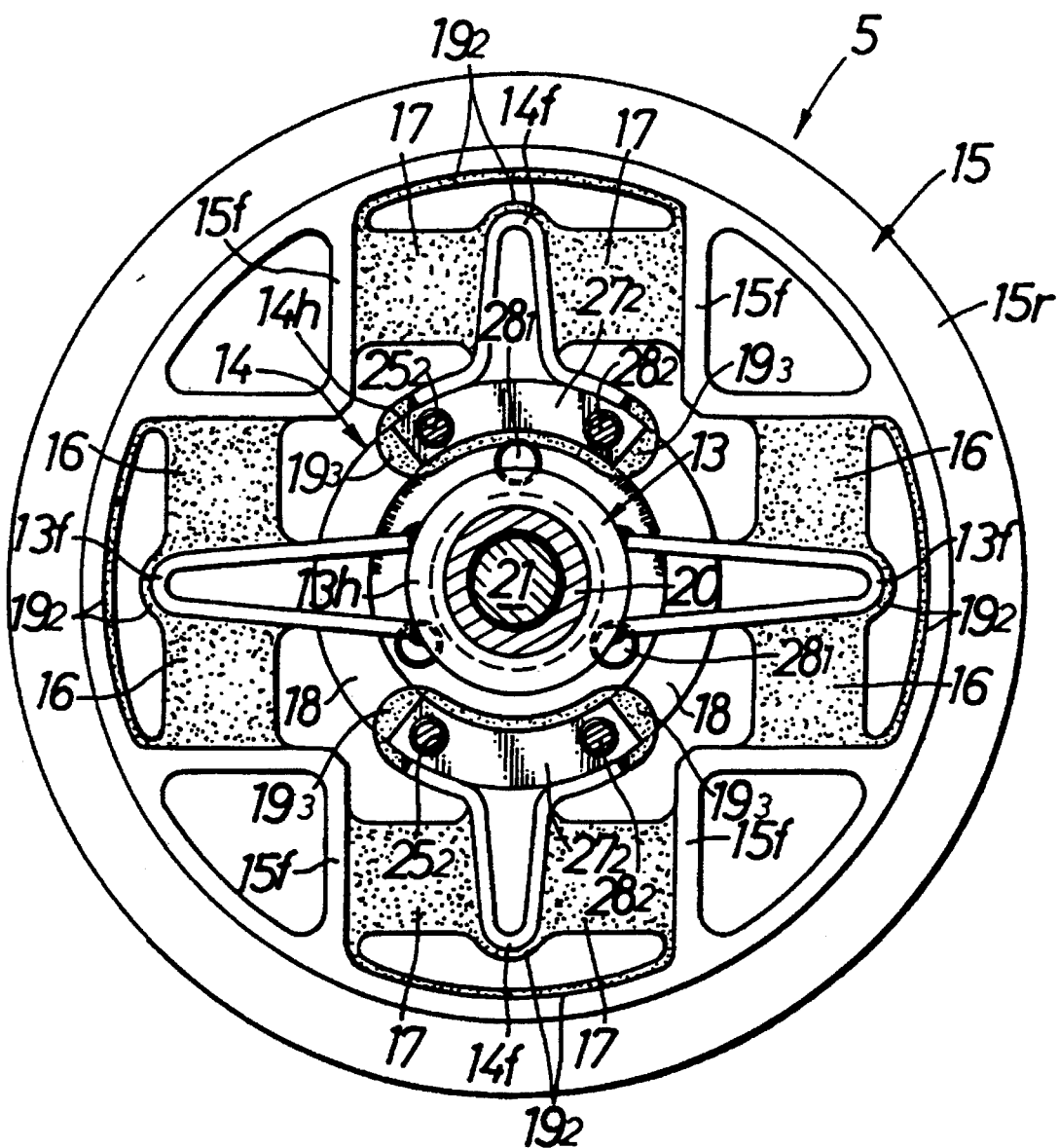
FIG. 11 is a sectional view similar to FIG. 5, but illustrating a modification to a displacement absorbing joint.

FIG. 11 illustrates a partial modification to the displacement absorbing joint 5 in the above-described embodiment. This modification includes a first resilient stop member $19_3$ mounted to an end face of a notch 18 of the second hub 14h for restricting the angle of relative rotation of the joint members 13 and 14 in a buffering manner. The first resilient stop member $19_3$ in this modification may be also combined with the second stop member $19_2$ used in the previously-described embodiment.

Figure 12:
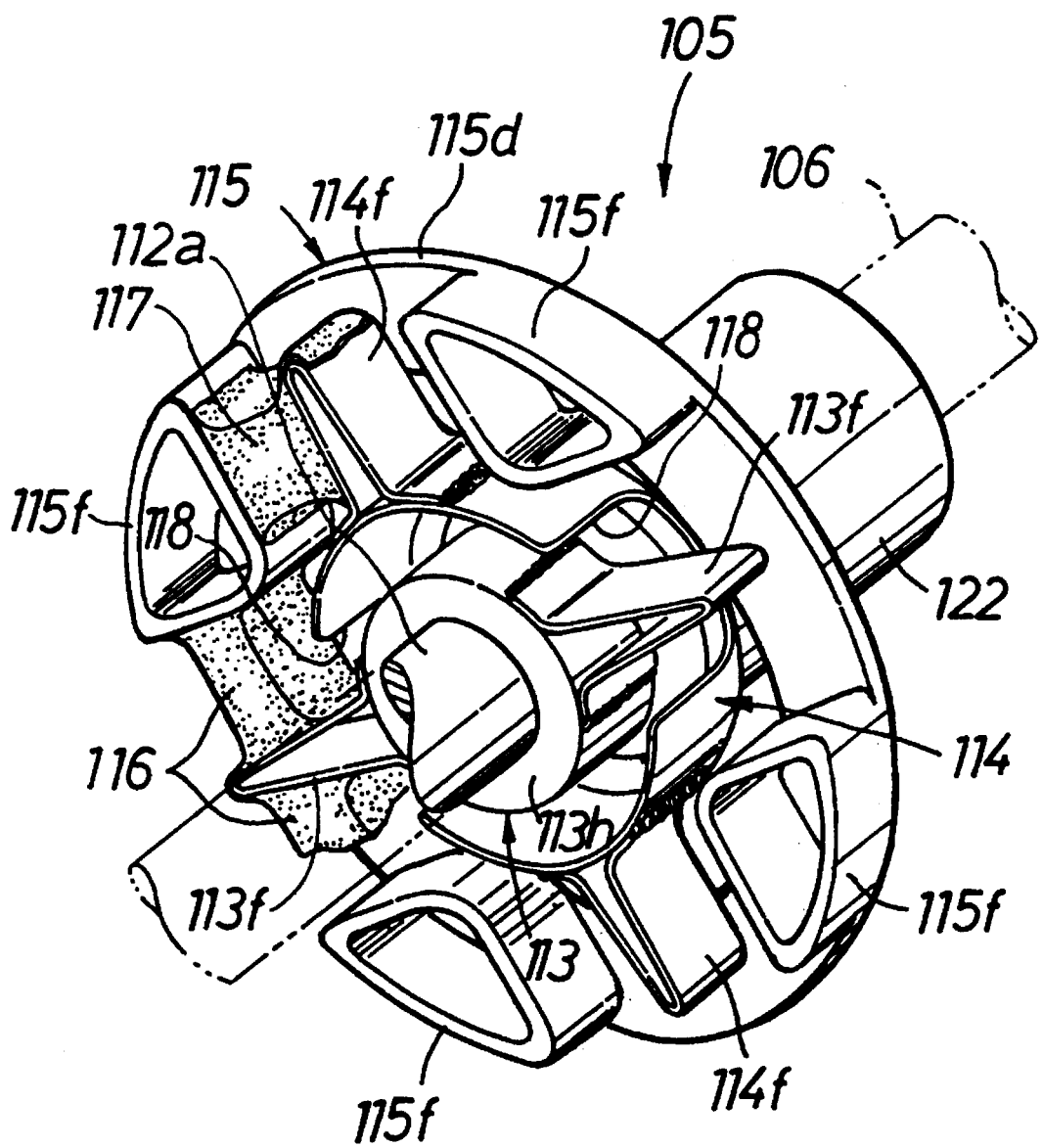
FIG. 12 is a perspective view similar to FIG. 6, but illustrating another modification to the displacement absorbing joint.
Figure 13:
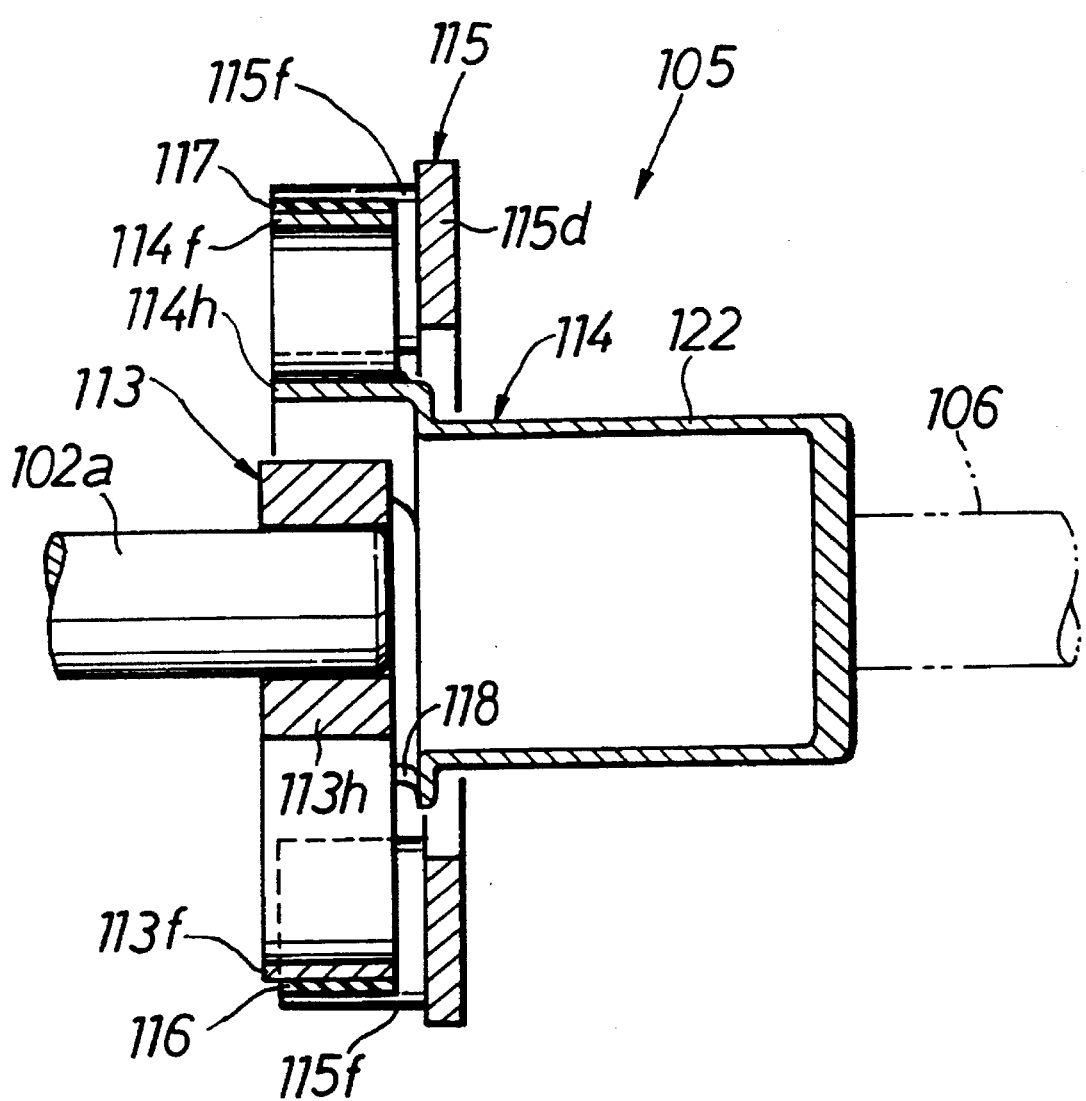
FIG. 13 is a longitudinal sectional side view of a joint shown in FIG. 12.

FIGS. 12 and 13 illustrate a further modification to the displacement absorbing joint. A joint 105 in this modification includes an intermediate member 115 having a different structure from that of the joint in the previously-described embodiment. More specifically, in place of the rim provided which surrounds the first and second transmitting fins 113f, 114f from the outside, an annular disk 115d is integrally provided on the intermediate member 115 to surround a first hub 113h or a second hub 114h disposed side by side on an axially one side of first and second transmitting fins 113f and 114f. Four intermediate fins 115f are projectingly mounted on one end face of the annular disk 115d. A shaft 106 serving as a power take-out member is properly connected to a cylindrical shaft 122 mounted to extend from the second hub 114h.

In this modification, resilient stop members are not mounted on rotation-wise opposed surfaces of the notch 118 of the second hub 114h and the first transmitting fin 113f, but it is evident that such members may be so disposed.

This modification is useful when a diametrically large space cannot be taken, because the intermediate member has no rim, resulting in a diametrically reduced dimension.

Although the present invention has been described by way of several embodiments, it will be understood that the present invention is not limited to these embodiments, various modifications in design may be made within the scope of the invention defined in claims. For example, in addition to the above-described power cultivator and power lawn mower, the present invention can be, of course, also applied to other types of power working machines.

Although the engine bed as the support is mounted as a member separate from the frame of the cultivator or the blade casing of the lawn mower in the above-described embodiments, the engine bed can be formed integrally with the frame or the blade casing.

Further, the first and second joint members may be disposed in a reverse manner, i.e., the second joint member may be connected to the output shaft of the engine, and the first joint member may be connected to the power take-off member.

The connections of the first and second joint members with the output shaft of the engine and the power take-off member may be achieved by other means. For example, a spline connection may be used, if necessary. Alternatively, a key may be used.

What is claimed is:

1. A vibration-proof power take-off device for an engine comprising:
    resilient support means through which the engine is carried on a support; and
    a displacement absorbing joint for connecting an output shaft of said engine to a power take-off member, said displacement absorbing joint being comprised of a first joint member for connection to the output shaft of said engine, a second joint member for connection to said power take-off member, and at least one resilient member for resiliently interconnecting both the first and second joint members,
    wherein said second joint member is rotatably carried on said support through a bearing means, and
    wherein said second joint member is disposed concentrical with said first joint member,
    wherein said output shaft of the engine is disposed horizontally in relation to the ground, wherein said resilient support means for supporting said engine on said support comprises a pair of resilient support members, and wherein said engine is supported at three support points, one support member of said pair of resilient support members being located at each of two of the support points and said displacement absorbing joint being located at the remaining one support point.

2. A vibration-proof power take-off device for an engine according to claim 1, further including a restricting means mounted between said support and said engine for restricting, within a given range, the displacement of the engine in an axial direction of said output shaft.

3. A vibration-proof power take-off device for an engine according to claim 1, wherein said output shaft of said engine is disposed vertically in relation to ground, wherein said resilient support means for supporting said engine on said support comprises a plurality of resilient support members, and wherein said displacement absorbing joint is disposed in a space defined between said support and said engine by said resilient support members.

4. A vibration-proof power take-off device for an engine according to claim 3, wherein the number of said resilient support members mounted is four.

5. A vibration-proof power take-off device for an engine according to claim 1, wherein said displacement absorbing joint is located in a space defined between said engine and said support.

6. A displacement absorbing joint comprising a first joint member having a first hub, a second joint member having a second hub concentrically surrounding said first hub, and an intermediate member interposed between said first and second joint members, said first hub provided with a plurality of first transmitting fins projecting radially outwardly from said first hub through notches provided in said second hub, said second hub provided with a plurality of second transmitting fins projecting radially outwardly from said second hub at distances circumferentially spaced from said first transmitting fins, said intermediate member provided with a plurality of intermediate fins opposed to said first and second transmitting fins in a rotational direction, and opposed surfaces of said intermediate fins and said first and second transmitting fins being interconnected through resilient members.

7. A displacement absorbing joint according to claim 6, including a gap between opposed portions of said first transmitting fins and said notches in said rotational direction, said gap being eliminated when an angle of relative rotation of the first and second hubs reaches a given value.

8. A displacement absorbing joint according to claim 7, wherein a pair of said first transmitting fins are disposed on one diametric line, and a pair of said second transmitting fins are disposed in a direction substantially perpendicular to said diametric line on which said first transmitting fins are disposed.

9. A displacement absorbing joint according to claim 6, wherein said intermediate member includes a rim surrounding said first and second transmitting fins from the diametrically outer periphery, and said intermediate fins project from an inner peripheral surface of said rim and are interposed between said first and second transmitting fins.

10. A displacement absorbing joint according to claim 9, further including resilient stop members mounted on at least one of radially opposed portions of each of said first and second transmitting fins and said rim.

11. A displacement absorbing joint according to claim 10, wherein each resilient stop member is formed integrally with adjacent resilient member.

12. A displacement absorbing joint according to claim 6, wherein said intermediate member includes an annular disk disposed adjacent one side of said first and second transmitting fins, and said intermediate fins project from one end face of said annular disk and are interposed between said first and second transmitting fins.

13. a displacement absorbing joint according to claim 6, 7, 8, 9 or 12, further including a resilient stop member mounted on at least one of opposed portions of said first transmitting fin and said notch in said rotational direction.

14. A displacement absorbing joint according to claim 13, wherein said resilient stop member is formed integrally with said resilient member.

15. A displacement absorbing joint according to claim 6, 7, 8 or 9, wherein said intermediate member is formed of a material having a density lower than those of said first and second joint members.

16. A displacement absorbing joint according to claim 6, wherein one of said first and second joint members is connected to an output shaft of a driving means, and the other of said first and second joint members is connected to a power take-off means.

17. A displacement absorbing joint according to claim 16, wherein said power take-off means is a driving pulley, and said other joint member is the second joint member, said second hub of the second joint member being provided with a pulley-mounting bore.

18. A displacement absorbing joint according to claim 16, wherein said other joint member is the second joint member, said second hub of the second joint member continuously provided with a cylindrical shaft, and said power take-off means is connected to said cylindrical shaft.

19. A vibration-proof power take-off device for an engine comprising:

resilient support means through which the engine is carried on a support; and a displacement absorbing joint for connecting an output shaft of said engine to a power take-off member, said displacement absorbing joint being comprised of a first joint member for connection to the output shaft of said engine, a second joint member for connection to said power take-off member, and a plurality of resilient members for resiliently interconnecting both the first and second joint members, wherein said second joint member is rotatably carried on said support through a bearing means, wherein said second joint member is disposed concentrical with said first joint member, and wherein said first joint member has a plurality of first radially projecting fins, and wherein said second joint member has a plurality of second radially projecting fins and wherein an intermediate member is provided and has a plurality of intermediate fins opposed to said first and second fins in a rotational direction of the joint, said plurality of resilient members being provided between said intermediate fins and said first and second fins, respectively, said intermediate fins being disposed concentrically with said first and second joint members.

20. A vibration-proof power take-off device for an engine comprising:

resilient support means through which the engine is carried on a support; and a displacement absorbing joint for connecting an output shaft of said engine to a power take-off member, said displacement absorbing joint being comprised of a first joint member for connection to the output shaft of said engine, a second joint member for connection to said power take-off member, and a resilient member for resiliently interconnecting both the first and second joint members, wherein said second joint member is rotatably carried on said support through a bearing means, wherein said second joint member is disposed concentrical with said first joint member, wherein said first joint member has a first hub with said first fins provided thereon, and wherein said second joint member has a second hub with said second fins provided thereon, said second hub surrounding said first hub from radially outside and being provided with notches for permitting said first fins to project radially outwardly through said notches.

* * * * *